US012697263B2

(12) United States Patent
Hutchinson et al.

(10) Patent No.: US 12,697,263 B2
(45) Date of Patent: Aug. 4, 2026

(54) INFANT INCUBATOR

(71) Applicant: Invictus Medical, Inc., San Antonio, TX (US)

(72) Inventors: George Martin Hutchinson, San Antonio, TX (US); Lilin Du, San Antonio, TX (US)

( * ) Notice: Subject to any disclaimer, the term of this patent is extended or adjusted under 35 U.S.C. 154(b) by 1370 days.

(21) Appl. No.: 17/369,750

(22) Filed: Jul. 7, 2021

(65) Prior Publication Data

US 2022/0008277 A1 Jan. 13, 2022

Related U.S. Application Data

(60) Provisional application No. 63/058,791, filed on Jul. 30, 2020, provisional application No. 63/052,759, filed on Jul. 16, 2020, provisional application No. 63/048,990, filed on Jul. 7, 2020.

(51) Int. Cl.
*A61G 11/00* (2006.01)
*G10K 11/178* (2006.01)

(52) U.S. Cl.
CPC ........ *A61G 11/00* (2013.01); *G10K 11/17823* (2018.01); *G10K 11/17854* (2018.01); *A61G 2203/34* (2013.01); *G10K 2210/1082* (2013.01)

(58) Field of Classification Search
CPC ...... A61G 11/00; A61G 2203/34; A61G 7/07; A61G 2200/14; A61G 11/009; G10K 11/17823; G10K 11/17854; G10K 2210/1082; G10K 2210/116; G10K 2210/3223; G10K 11/17857; G10K 11/17881
USPC ........................................................ 600/21–22
See application file for complete search history.

(56) References Cited

U.S. PATENT DOCUMENTS

| | | | | |
|---|---|---|---|---|
| 5,692,053 | A | 11/1997 | Fuller et al. | |
| 5,699,437 | A | 12/1997 | Finn | |
| 7,237,849 | B2 | 7/2007 | Uchiyama et al. | |
| 7,933,420 | B2 | 4/2011 | Copley et al. | |
| 8,068,616 | B2 | 11/2011 | Copley et al. | |
| 8,270,625 | B2 | 9/2012 | Sommerfeldt et al. | |
| 8,340,318 | B2 | 12/2012 | Copley et al. | |
| 2009/0147965 | A1* | 6/2009 | Kuo | A47G 9/10 379/420.01 |
| 2010/0014690 | A1 | 1/2010 | Wolff et al. | |
| 2011/0274283 | A1 | 11/2011 | Athanas | |
| 2014/0003614 | A1 | 1/2014 | Levitov et al. | |
| 2014/0307888 | A1 | 10/2014 | Alderson et al. | |
| 2016/0125882 | A1 | 5/2016 | Contolini et al. | |
| 2016/0199241 | A1 | 7/2016 | Rapoport | |
| 2016/0206471 | A1* | 7/2016 | Rapoport | A61M 16/105 |
| 2017/0084264 | A1 | 3/2017 | Kuo et al. | |
| 2018/0005643 | A1 | 1/2018 | Tsingos | |
| 2018/0122358 | A1 | 5/2018 | Bhimavarapu et al. | |
| 2018/0374469 | A1 | 12/2018 | Hutchinson et al. | |
| 2019/0088247 | A1 | 3/2019 | True | |
| 2020/0105240 | A1* | 4/2020 | Griffin | G10K 11/17813 |

FOREIGN PATENT DOCUMENTS

| | | | |
|---|---|---|---|
| WO | WO 2007/066259 | A2 | 6/2007 |

* cited by examiner

*Primary Examiner* — Sunita Reddy

(57) ABSTRACT

Systems and methods are provided for an infant incubator having features for active noise cancellation, including enclosure designs, positioning systems, and error sensor selection.

10 Claims, 17 Drawing Sheets

INFANT INCUBATOR

CROSS-REFERENCE TO RELATED APPLICATIONS

This application claims the benefit of U.S. Prov. App. Ser. No. 63/048,990, filed Jul. 7, 2020; 63/052,759, filed Jul. 16, 2020; and 63/058,791, filed Jul. 30, 2020, which are hereby incorporated by reference in their entirety.

BACKGROUND

Technological advances in neonatal intensive care have contributed greatly to decreases in infant mortality. The NICU clinical team must provide support of basic functions including temperature and humidity control, nutritional support, fluid and electrolyte maintenance, respiratory support, and skin integrity management. However, the mission of NICU care is also to support the healthy development of the infant. A critical component of healthy development is limiting the noxious noise to which the patient is exposed while providing appropriate aural stimulation to promote brain and language development. Full-term newborn infants have sufficiently developed mechanisms to cope with environmental stressors such as noise and light. Conversely, a fetus is developmentally equipped to survive in the muffled, dim environment of the womb. Thus, the central nervous system of a preterm infant is ill-prepared to cope with the extrauterine environment in which it finds itself. While stressors such as light can be relatively easily decreased by current NICU practices of dimming overhead lights, covering incubators with blankets, or using blindfolds, noise is not so easily addressed. Since fetuses begin responding to sounds as early as 24 weeks, potentially noxious noise levels in the NICU are of primary concern.

Noise levels in NICUs have been shown to be consistently louder than guidelines provided by the American Academy of Pediatrics (AAP). These guidelines stipulate that the noise levels that the hospitalized infants are exposed to should not exceed 45 dB, A-weighted (dBA), averaged over one hour and should not exceed a maximal level of 65 dBA averaged over one second. Noise measured both inside and outside an incubator show guidelines are frequently exceeded throughout the day.

Looking specifically at the sources of noise in the NICU, most are life-critical devices or communication between caregivers, which is often essential for proper care of patients. Specifically, the continuous positive airway pressure (CPAP) device and bradycardia alarms have been reported as consistently quite loud. These are essential elements of safe NICU care; their use is not optional, yet they provide a noise hazard to the patient population. Health risks from noise exposure are many and significant. Adequate sleep is essential for normal development and growth of preterm and very low birth weight infants and can enhance long-term developmental outcomes. Similarly, it has been shown that noise increases various measures of stress in hospitalized infants. The benefits of decreasing sound levels are included in interdisciplinary recommendations for NICU design, suggesting that this "will protect sleep, support stable vital signs, and improve speech intelligibility for many infants most of the time." In addition to these observational studies, an investigation of the effect of sound reducing ear covers evaluated the effect of actively deadening sounds on the sleep state of NICU patients. In a cross-over study using ear covers, it was found that the patients exposed to the quieter conditions experienced more deep sleep than active sleep compared to a control group.

Active noise control (ANC) may comprise sampling an original varying sound pressure waveform in real time, analyzing the characteristics of the sound pressure waveform, generating an anti-noise waveform that is essentially out of phase with the original sound pressure waveform, and projecting the anti-noise waveform such that it interferes with the original sound pressure waveform. In this manner, the energy content of the original sound pressure waveform is attenuated.

Early implementations of this technique were realized with analog computers as early as the 1950s. However, these analog implementations were not able to adapt to changing characteristics of the noise as the environmental conditions changed. With digital technology, adaptive ANC became possible. Sound waves are described by variations in acoustic pressure through space and time where acoustic pressure is the local deviation from atmospheric pressure caused by the sound wave. Incident sound waves can superimpose one upon another in which the net response at a given position and time is the algebraic sum of the waveforms at that point and time. This is known as constructive interference if the resulting pressure is greater than the pressure of any of the incident waveforms and destructive interference if the resulting pressure is less than any of the incident waveforms.

An active noise control system suitable for use with the present invention is described in U.S. Pat. No. 10,410,619, the entire contents of which are incorporated by reference as if set forth in their entirety herein. The ANC system is provided for use proximate a support surface in an environment with multiple noise sources that emit noise sound waves either on a constant, periodic, or irregular basis. The active noise control system comprises an array of reference input sensors arranged essentially around the perimeter of the support surface, an error input sensor adapted to be located proximate to a spatial zone in which noise attenuation is desired, a control output transducer, and a control unit executing an adaptive algorithm. The control unit is in data communication with the array of reference input sensors, the error input sensor, and the control output transducer. The spatial zone is within the bounds of the support surface. The adaptive algorithm is configured to utilize input signals from the array of reference input sensors and the error input sensor to generate a control signal for the control output transducer. The control signal, when broadcast by the control output transducer, generates a control sound wave that is configured to destructively interfere with noise sound waves from the noise source or sources when the noise sound waves enter the spatial zone.

A description of a mechanical and electronic configuration of speakers and error sensors associated with an ANC device operating in conjunction with an incubator is found in Applicant's U.S. patent application Ser. No. 17/020,725, which is hereby incorporated by reference in its entirety. A description of systems and methods for noise cancellation in incubators is provided by U.S. Pat. No. 9,247,346, which is hereby incorporated by reference in its entirety. A description of systems and methods for using one or more two-dimensional energy density sensors feeding a control system to effectively diminish acoustic noise is provided by U.S. Pat. No. 7,327,849, which is hereby incorporated by reference in its entirety.

BRIEF SUMMARY OF THE INVENTION

In the following description, numerous details are set forth to provide a more thorough explanation of embodiments of the present invention. It will be apparent, however, to one skilled in the art, that embodiments of the present invention may be practiced without these specific details.

An infant incubator can be constructed and configured in ways that have not been appreciated in the more than 100 years that they have been built and used in a clinical setting in order to provide a more appropriate environment for the hospitalized infant. In one aspect of the invention, an active noise control (ANC) system can be embedded within the structure of the infant incubator. The ANC system comprises at least one and sometimes more than one speaker. The speaker must be capable of delivering sound waves of the same range of frequencies that are in the incubator's environment, which extend as low as 60 Hz. Speakers that can generate frequencies as low as this will have a diameter of 10 cm or larger. Mounting these within the confines of the incubator shell where the infant is located would likely interfere with nursing care. This invention includes adapting the structure of the infant incubator to act as a speaker enclosure or speaker cabinet, obviating the need for a bulky structure within the care area of the incubator. This speaker enclosure, especially when equipped with a reflex port or a passive radiator will extend the lower frequency range beyond the range of an unboxed speaker driver.

In another aspect of this invention, an ANC system having an error sensor deployed in the incubator is improved by modifying the shell of the incubator to eliminate or reduce the presence of sound wave nulls caused by standing sound waves. A null occurring at or near the location of the error sensor will adversely affect the ability of the ANC system to attenuate sound. To the extent that the error sensor is at a null, no error signal will be detected, indicating to the ANC system that that particular frequency has been greatly reduced or eliminated when, in fact, the ANC system has not attenuated that frequency. The shape of the shell of the incubator is, in this invention, adapted in a way to prevent or reduce the proclivity to produce standing waves and the accompanying nodes.

In another aspect of this invention, the error sensor of an ANC system comprises an array of sensors such as microphones that are arranged in the incubator shell where the patient would be positioned. In an embodiment, these may be embedded in the mattress on which the patient lies. A location detection system is included in the invention, the location detection system identifying the location of the patient within the incubator shell and indicating to the ANC system which of the array of microphones of the error sensor are ideally suited to detect a residual noise level near the ears of the patient within the incubator shell.

In another aspect of the invention, a shell of an infant incubator is configured to passively attenuate environmental sounds from penetrating into the patient space. The shell comprises a multilayer assembly in which two or more layers of dissimilar materials are used. In an embodiment, a layer of air is encased between two layers of transparent structure, wherein the layer of air constitutes one of the dissimilar materials. During the over one hundred years of manufacture and use of infant incubators, walls have been constructed of a single layer of material, in some cases of a polycarbonate material or another thermoplastic.

These and other aspects of the devices of the invention are described in the figures, description and claims that follow. As used herein, unless otherwise indicated, "or" does not require mutual exclusivity.

DETAILED DESCRIPTION OF THE INVENTION

Figure 1:
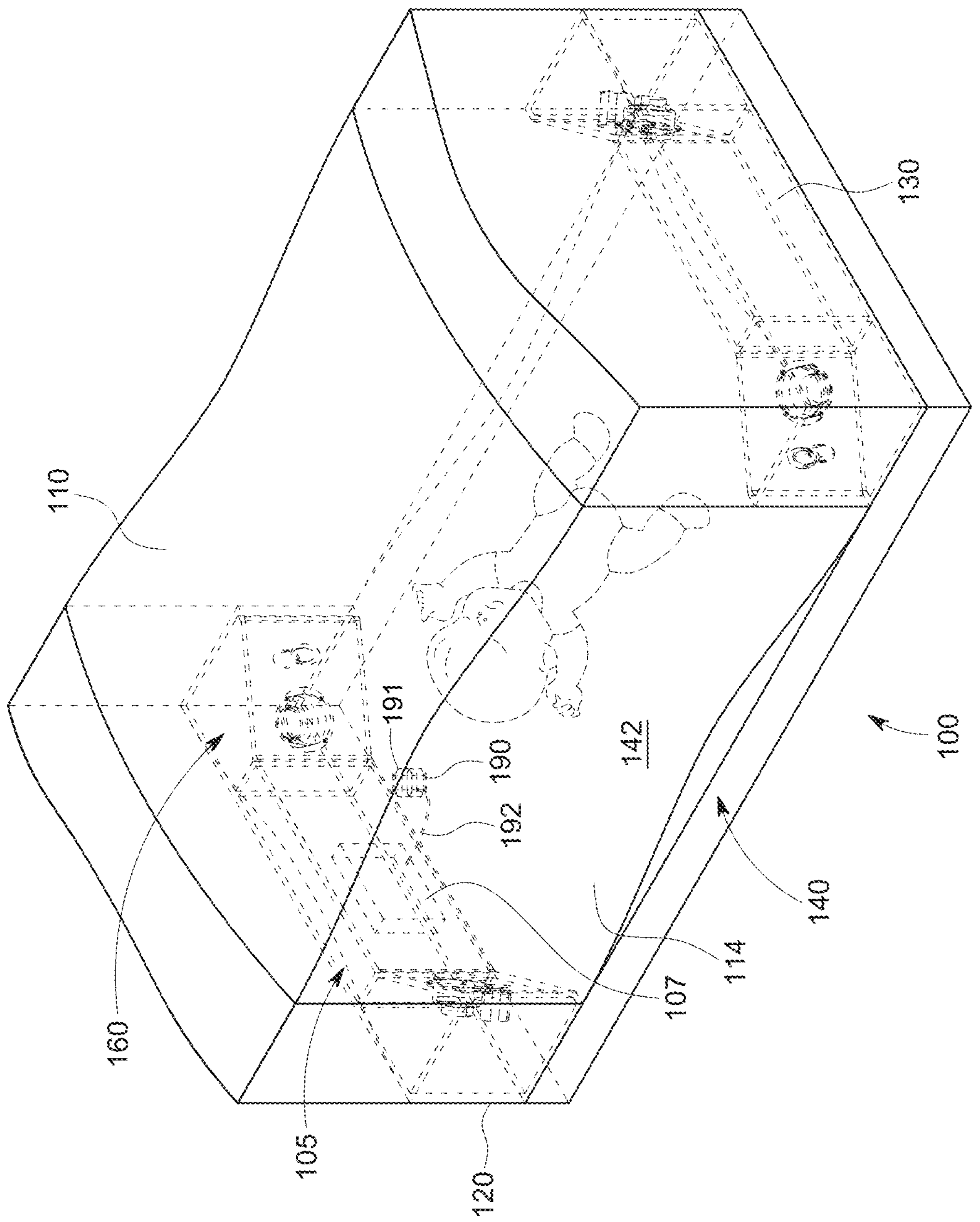
FIG. 1 shows a perspective view of an infant incubator comprising an active noise control system.

Referring to FIGS. 1-4, in an embodiment of the invention, an infant incubator 100 is equipped with an ANC system 105 comprising a control unit 107, as generally described in U.S. Pat. No. 10,410,619. The infant incubator 100 comprises a series of incubator walls including top wall 110, side walls 112, 114, and a first head wall 120, and a second head wall 130 that make up the incubator shell or enclosure, and a support layer 140 having a support surface 142, The incubator walls and support surface 142 define an internal volume 180 of incubator 100 where a preterm infant may be positioned to receive neonatal care.

First head wall 120 includes a speaker driver 150, and integrally forms speaker enclosure 160 in which the speaker driver 150 fits. In one embodiment, the speaker enclosure 160 is positioned above the support surface 142, however, other orientations are also possible. In another embodiment, the speaker enclosure 160 is positioned below the level of the support surface 142. The speaker driver 150 is in data communication with the control unit 107. Additionally, the ANC system 105 also comprises a residual noise sensor 190, shown as an error sensor 191, and a reference sensor mounted external to the incubator 100.

The speakers 150 that are part of an ANC system 105 can be self-contained units as generally known in the art. In a novel approach, the speaker driver 150 can be oriented within the structure of the infant incubator in a manner that utilizes the incubator structure, for example within the structure of first head wall 120, as a speaker enclosure 160 to generate the appropriate sound profile, obviating the need for a separate and bulky speaker enclosure. In some embodiments the incubator structure is equipped with a reflex port 170, sized and positioned to provide an appropriate sound profile to match the needs of the ANC system 105.

The ANC system 105 is designed to be capable of generating sound waves of the same frequency and amplitude of the noises to be attenuated. The factors that dictate the pressure and frequency response of the speaker system include power rating, dimensions, and efficiency of the speaker driver 150, the dimensions and rigidity of the speaker enclosure 160 in which the speaker driver 150 is mounted, the position of the speaker driver 150 in the speaker enclosure 160, the presence and configuration of an absorbent lining within the speaker enclosure 160, and if present, the dimensions of a reflex port 170 of the speaker enclosure 160, as are generally known in the speaker art. The low-end frequency response required to respond to environmental noises likely to be encountered during use of an incubator in a hospital is between about 50 Hz and 250 Hz. Humans, especially infants, may not be sensitive to frequencies below 100 Hz. The high frequency response required to respond to environmental noises likely to be encountered during use of an incubator in a hospital is between about 3,000 Hz and 4,000 Hz. In some embodiments, the speaker needed to accommodate this frequency range may require either two drivers, one for high frequencies (tweeter) and one for lower frequencies (midrange or woofer). In another embodiment, a bass flex port enclosure design is employed with a large enclosure. Fitting either of these two designs within the internal volume 180 of the incubator shell is not possible because of the problems with interfering with normal nursing care of the infant within. What has not yet been appreciated is that the entire body of the incubator 100, either above or below the level of the patient support surface 142, can be utilized as the speaker enclosure 160. This invention encompasses implementing a cavity in the body of the incubator 100 that is acoustically coupled to a speaker driver 150 or drivers that are mounted in the body of the incubator 100. The speaker driver 150 or drivers are oriented to face the interior of the incubator 100.

In one embodiment, a four-inch speaker driver 150 is deployed in the speaker enclosure 160 built into the first head wall 120 of incubator 100 having Thiele/Small parameters of $$R_E = 6.3\Omega$$

$$f_s = 60 \text{ Hz}$$

$$B_l = 5.4TM$$

$$V_{AS} = 6.4L$$

$$Q_{ms} = 2.2$$

$$Q_{es} = 0.39$$

$$S_D = 81.03 \text{ cm}^2$$

Constructing a speaker enclosure 160 within the structure of the incubator 100 having a volume $V_{box}$ of 3.65 L, a single reflex port 170 having a diameter of 3 cm and a length of 9.2 cm provides the frequency response having a 3 dB down point of 80 Hz.

A covering over the reflex port 170, the face of the speaker driver 150, or both, is contained in an embodiment. The covering may be an acoustically transparent cloth. The covering may be a membrane fixed tautly over the port opening. The membrane covering may be selected and dimensioned to be an effective microbial barrier that prevents or inhibits passages of bacteria or viruses, or other microbes between the interior of the shell of the incubator 100 and the interior of the incubator. In some embodiments, speaker driver 150 is covered by a membrane that may be wipeable and that prevents bacteria or viruses from passing from the interior of the incubator 100 to the surface of the speaker driver 150. Such membranes may be selected from a set of materials that are suitable for disinfecting by germicidal agents. An example of the membrane material is polytetrafluoroethylene (PTFE) although other materials are also suitable. The covering may also have compliance appropriate to act as a passive radiator.

Figure 2:
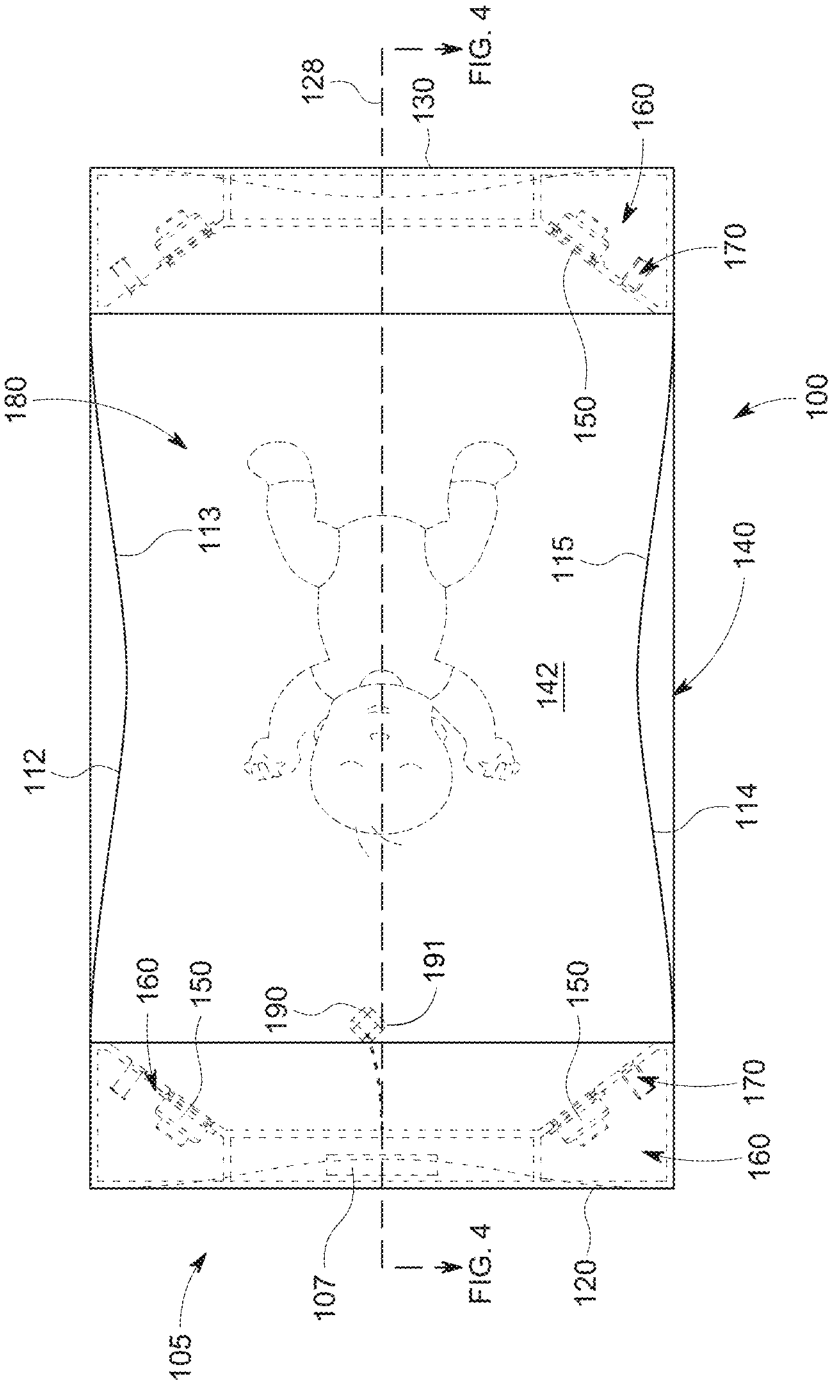
FIG. 2 shows a top plan view of the infant incubator of FIG. 1.
Figure 3:
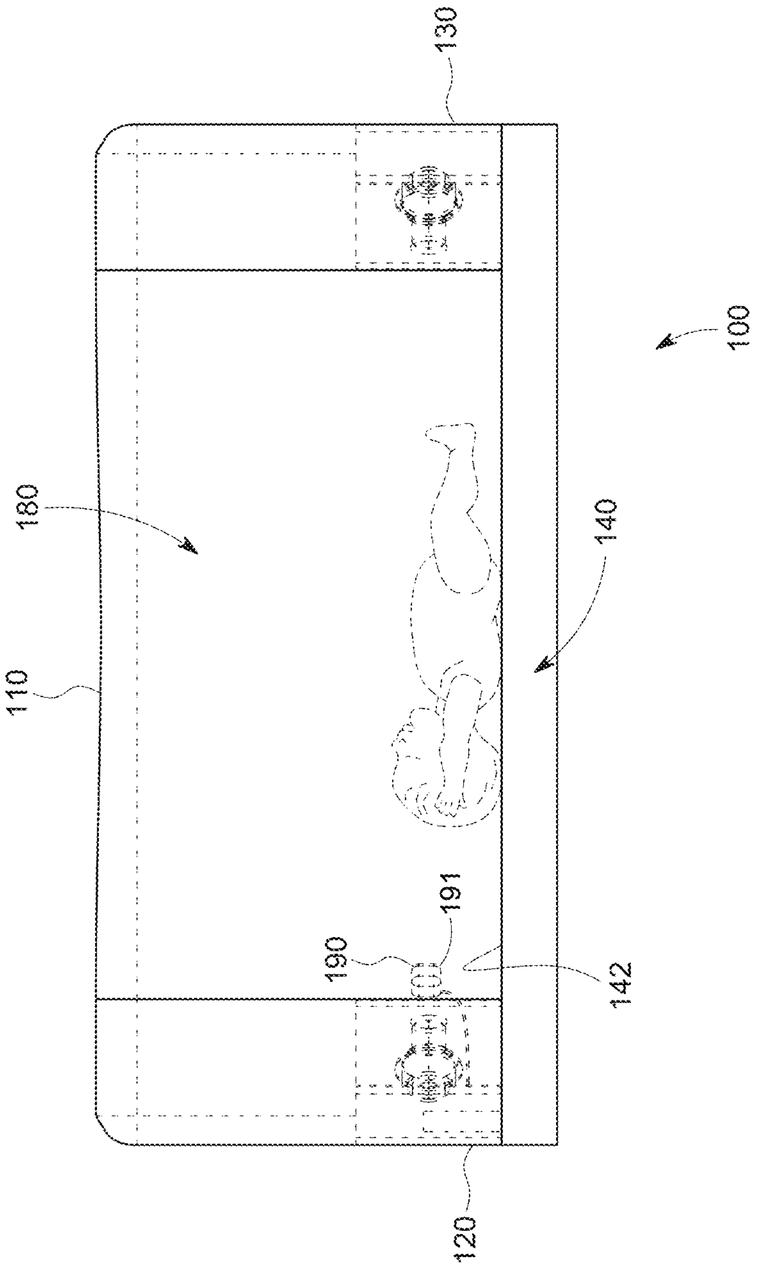
FIG. 3 shows a side view of the infant incubator of FIG. 1.
Figure 4:
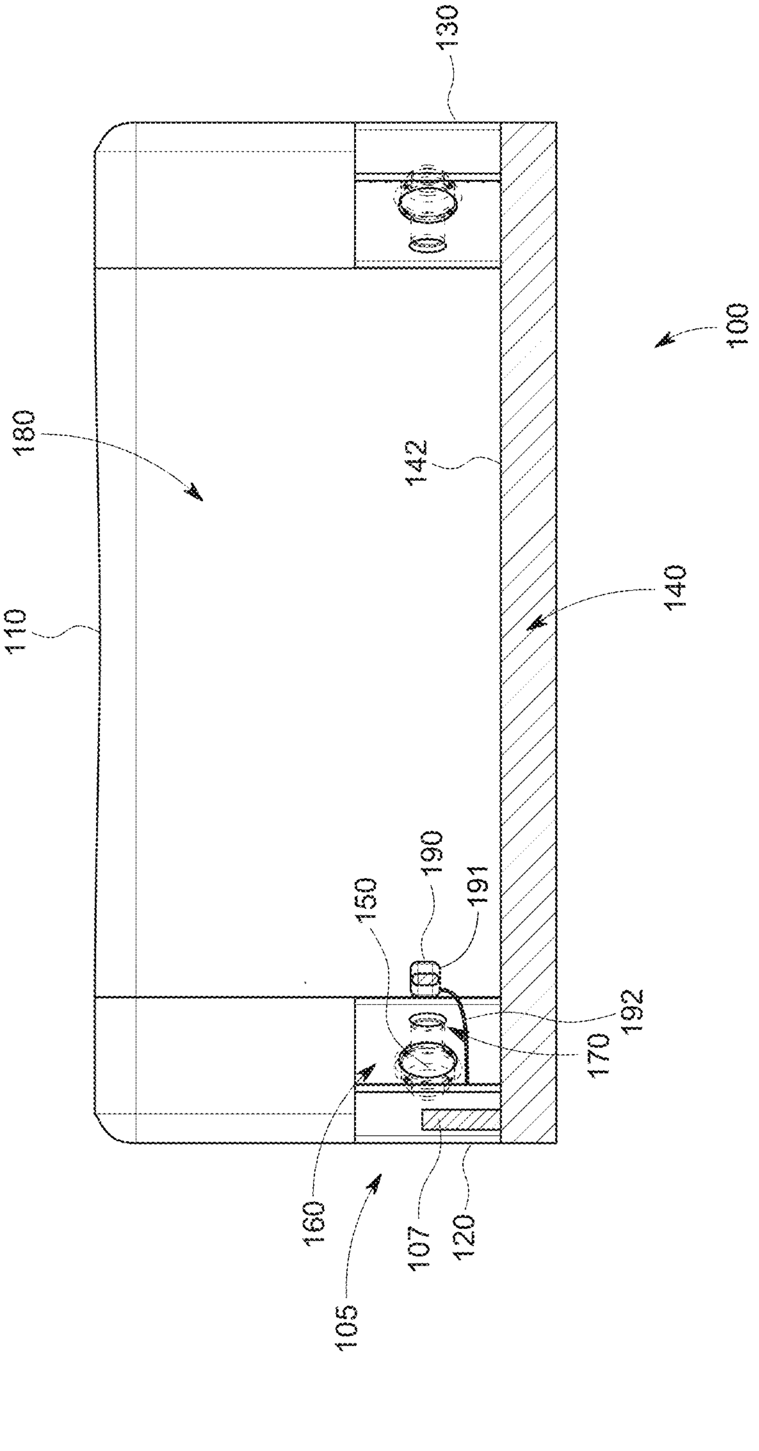
FIG. 4 shows a side cross-sectional view of the infant incubator of FIG. 1.
Figure 5:
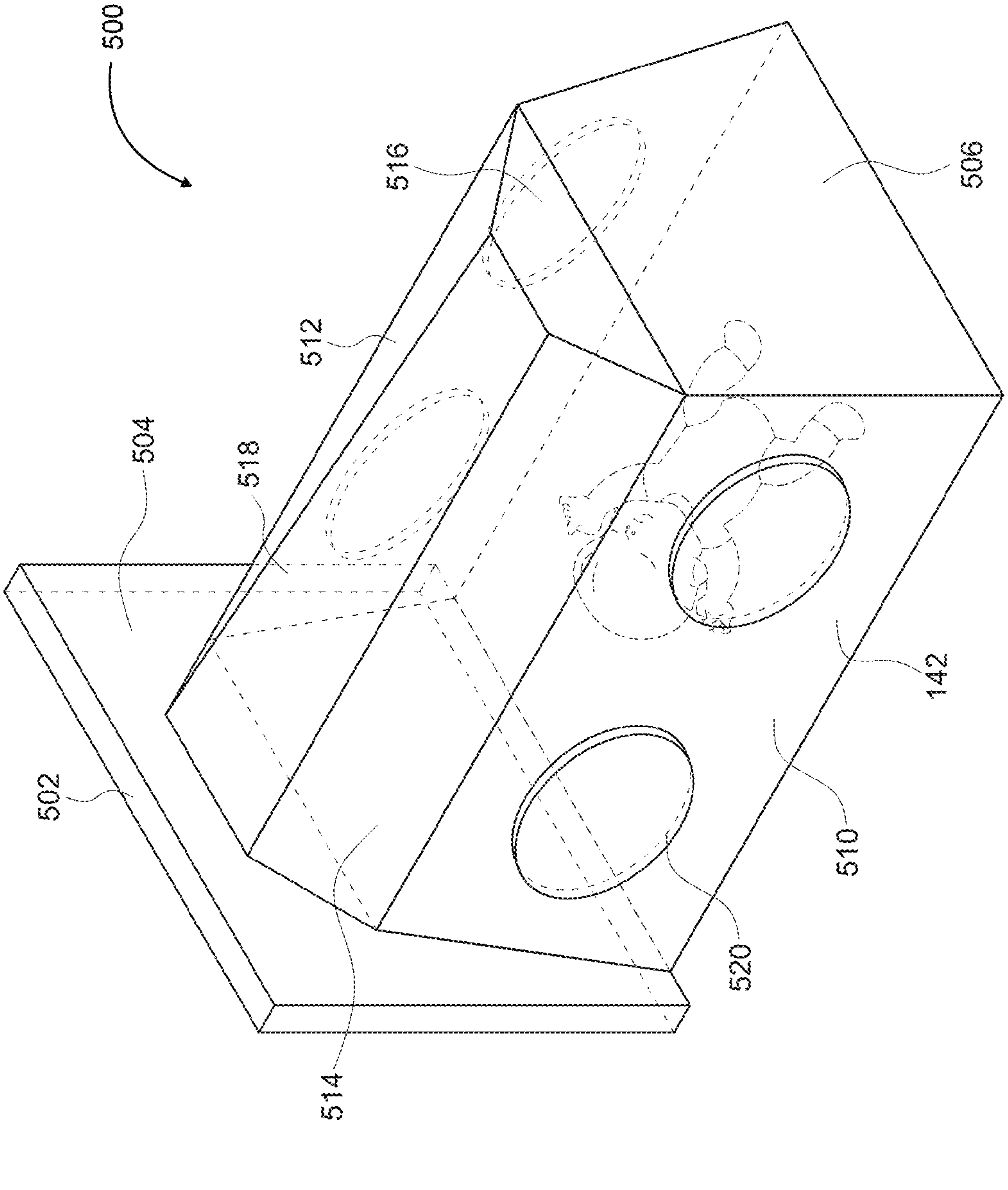
FIG. 5 shows a perspective view of another embodiment of an infant incubator.
Figure 6:
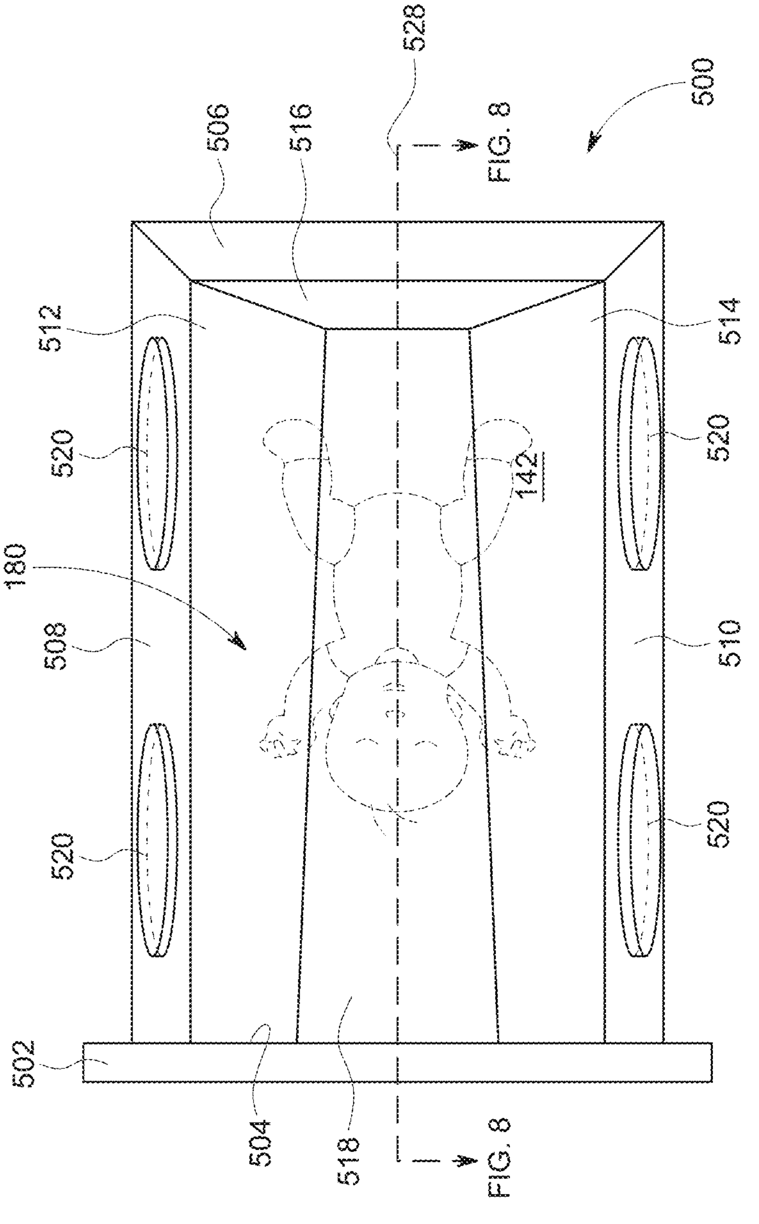
FIG. 6 shows a top plan view of the infant incubator of FIG. 5.

With an ANC system 105, it can be useful for the error sensor 191 to be positioned such that it is not at a null point for one or more frequencies. Standing waves between parallel walls can be found when the distance between the walls is a multiple of half of the wavelength of a sound wave. Should the error sensor be positioned at a null of the standing wave, the ANC system 105 would be blind to the actual remaining noise levels of that frequency and would not continue to adjust its filters to minimize the sound wave through the introduction of a cancelling sound wave. It has not been appreciated in the use of an active noise control system in an infant incubator to minimize or eliminate the presence of nulls within the shell of the incubator 100. As shown in FIG. 2, error sensor 191 is offset from centerline 128 of incubator 100 such that error sensor 191 is not equidistant from opposing side walls 112, 114, and is not within a potential null point between walls 112, 114.

The incubator walls (for example, top wall 110 and side walls 112, 114) forming the shell of the incubator 100 are typically formed of a clear material to provide visual accessibility to the interior of the shell. In embodiments of the invention, the incubators walls are dimensioned, shaped, and oriented to prevent standing acoustic waves within the shell of the incubator 100. In one embodiment, the walls of the incubator shell are essentially flat or planar surfaces, none of which are parallel to any other wall of the incubator shell. In an illustrative example, the walls are essentially vertical surfaces but are numbered or positioned wherein no two walls are parallel. In an example of this, the number of the walls is four but the shape of the combination of the walls does not form a rectangle as might be accomplished if the walls opposite each other are not of the same length. In another example of this, the number of walls of the incubator shell is five in which none of the walls is parallel to any other wall. Any other number of walls of the shell of the incubator may be used and still be encompassed by the present invention.

Referring again to FIGS. 1-4, in another embodiment, one or more walls of the shell of the incubator are curved and not planar. In an illustrative example, the vertical walls of the incubator shell are curved in one or more dimensions (e.g., vertically or horizontally or both). First side wall 112 is provided with a curved portion 113, and second side wall 114 is provided with curved portion 115. First side wall 112 and second side wall 114 form a pair of opposing faces of internal volume 180 In this manner, opposing faces 112 and 114 are substantially non-parallel.

In one embodiment, less than 50 percent of the surface areas of opposing faces of volume 180 are parallel. In preferred embodiments, less than 25 percent of the surface areas of opposing faces of volume 180 are parallel. In still more preferred embodiments, less than 10 percent of the surface areas of opposing faces of volume 180 are parallel.

In some embodiments, less than 50 percent of the total surface area of the internal volume 180 is co-planar with another surface in volume 180. In some embodiments, less than 50 percent of the total surface area of the internal volume 180 is co-planar with another surface of the internal volume. In preferred embodiments, less than 25 percent of the total surface area of the internal volume 180 is co-planar with another surface of the internal volume. In more preferred embodiments, less than 10 percent of the total surface area of the internal volume 180 is co-planar with another surface of the internal volume.

The walls of the shell of the incubator, in another embodiment of the invention, are oriented at an angle not perpendicular to the horizon. By way of an illustrative example, in a rectangular arrangement of a first set of two similarly dimensioned walls opposite each other and second set of two similarly dimensioned walls opposite each other, each pair of opposite walls are tilted away from a vertical orientation with the result that the opposite walls are not parallel.

Referring to FIGS. 5-8, one embodiment of an incubator enclosure 500 having non-parallel internal faces is shown. Patient support 140 and patient support surface 142 are generally horizontally disposed to support a patient. First head wall 502 is generally planar and vertically oriented perpendicular to support surface 142. First head wall 502 may contain components of an ANC system including control unit 107 and one or more speakers 150, as shown in FIGS. 1-4. Enclosure 500 may optionally be provided with one or more viewing and access ports 520. Ports 520 may be removable sections allowing access to internal volume 180 to allow for patient care within the controlled environment of the incubator.

Figure 7:
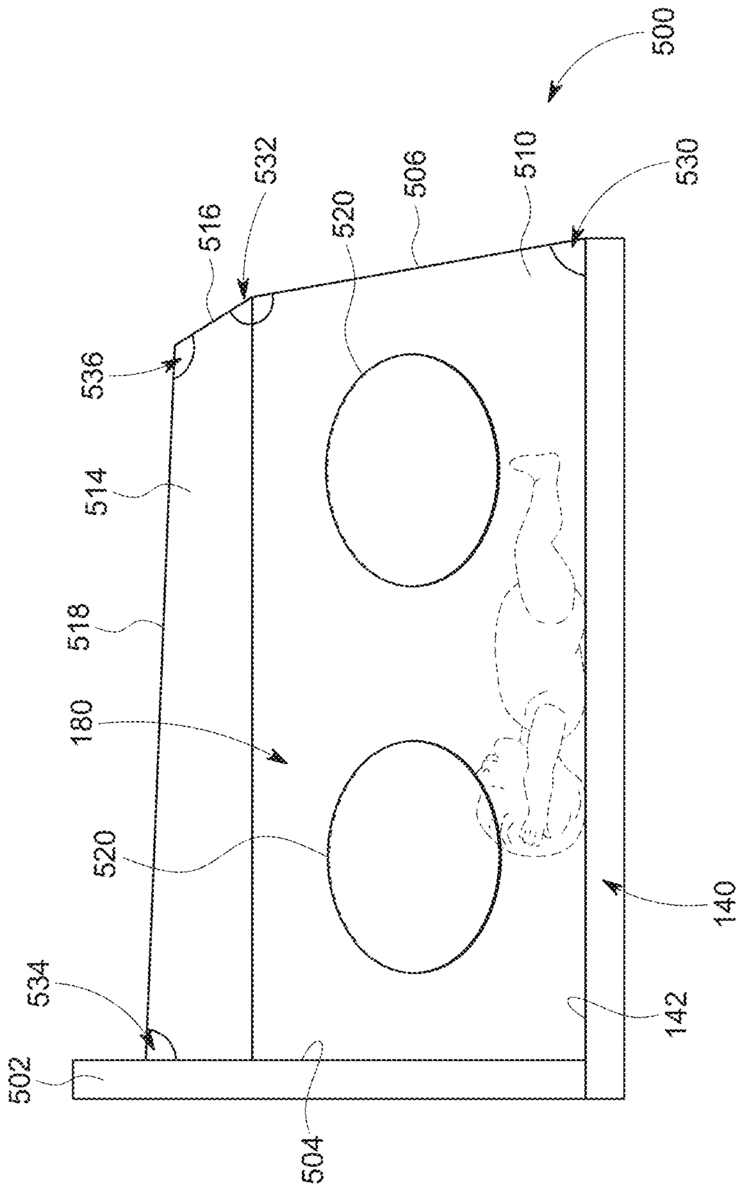
FIG. 7 shows a side view of the infant incubator of FIG. 5.
Figure 8:
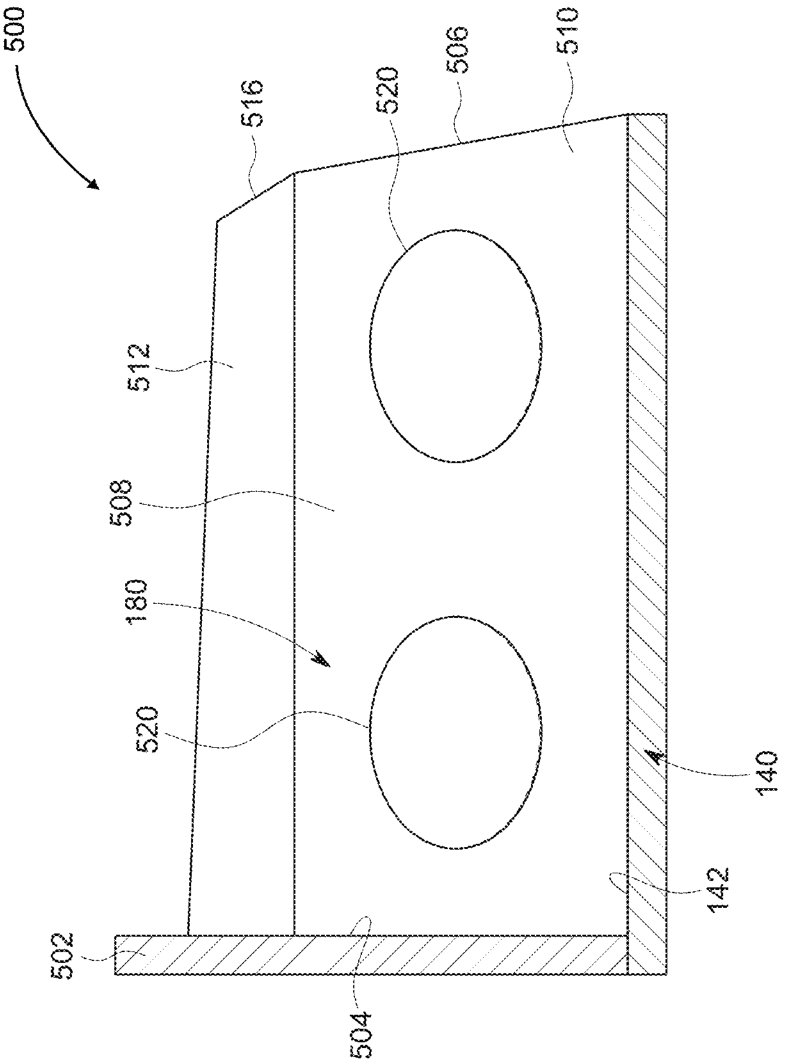
FIG. 8 shows a side cross-sectional view of the infant incubator of FIG. 5.
Figure 9:
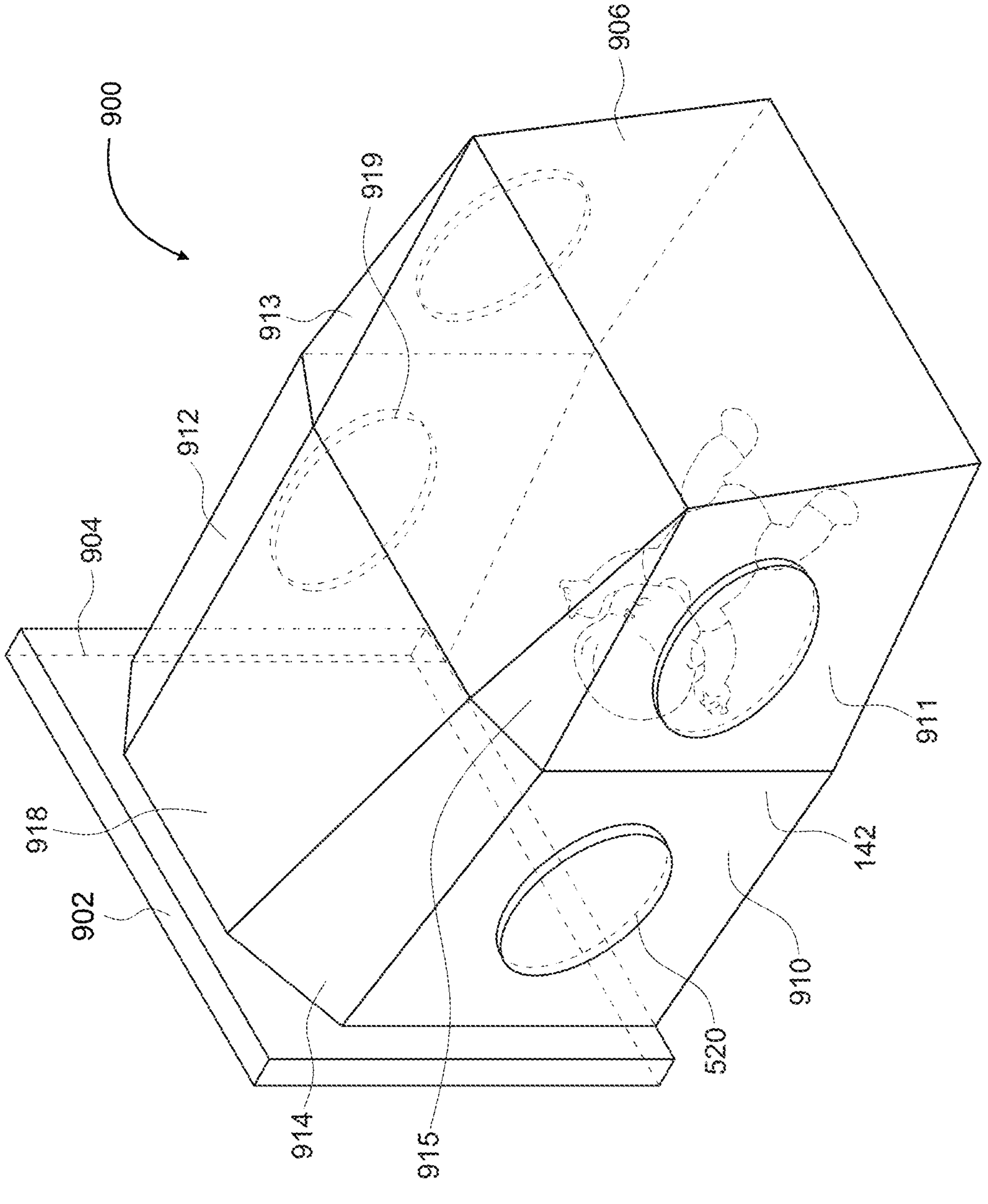
FIG. 9 shows a perspective view of another embodiment of an infant incubator.

As best shown in FIG. 7, a generally planar second head wall 506 is tilted away from vertical such that second head wall 506 intersects with patient support surface at a first internal angle 530. Accordingly, second head wall 506 is non-parallel with first head wall 502. In some embodiments, internal angle 530 is between 70 degrees and 89 degrees. In preferred embodiments, internal angle 530 is between 80 degrees and 85 degrees.

Generally planar side walls 508, 510 are similarly tilted away from vertical such that side walls 508 and 510 each form an internal angle at the respective intersection with patient support surface 142. The internal angles formed at the intersection of patient support surface 142 and side walls 508, 510 may be the same or different, and may be same or different from internal angle 530. Accordingly, side wall 508 is non-parallel with side wall 510. The internal angles formed at the intersection of patient support surface 142 and side walls 508, 510 may be between 70 degrees and 89 degrees, and preferably between 80 degrees and 85 degrees. In some embodiments, side wall 508 may be vertical and opposing side wall 510 be tilted away from vertical.

Still referring to FIG. 7, top panel 518 is angled away from horizontal with respect to patient support 140 and patient support surface 142. Top panel 518 intersects with first head wall 502 at internal angle 534. Accordingly, top panel 518 is non-parallel with patient support surface 142. In embodiments, internal angle 534 is between 70 degrees and 89 degrees, and preferably between 80 degrees and 85 degrees.

Enclosure 500 may optionally be provided with transition panels 512, 514, and 516. Transition panel 516 is shown with a transition angle 532 at the intersection with second head wall 506. Each transition panel 512, 514, and 516 is non-parallel with opposing patient support surface 142, and non-parallel with each other. In some embodiments, transition angle 532 is between 155 degrees and 179 degrees, and preferably between 160 degrees and 170 degrees. Transition panels 512, 514 may have similar transition angles with side walls 508, 510 respectively.

The walls of the shell of the incubator, in another embodiment of the invention, are vertically oriented and disposed in a non-rectangular arrangement of a first set of two similarly dimensioned walls opposite each other and second set of two similarly dimensioned walls opposite each other, each pair of opposite walls are oriented away from a rectangular configuration with the result that the opposite walls are not parallel.

Referring to FIGS. 9-12, an incubator enclosure 900 having non-parallel internal faces is shown. Patient support 140 and patient support surface 142 are generally horizontally disposed to support a patient. First head wall 902 is generally planar and vertically oriented perpendicular to support surface 142. First head wall 902 may contain components of an ANC system including control unit 107 and one or more speakers 150, as shown in FIGS. 1-4. Enclosure 900 may optionally be provided with one or more viewing and access ports 520.

Figure 10:
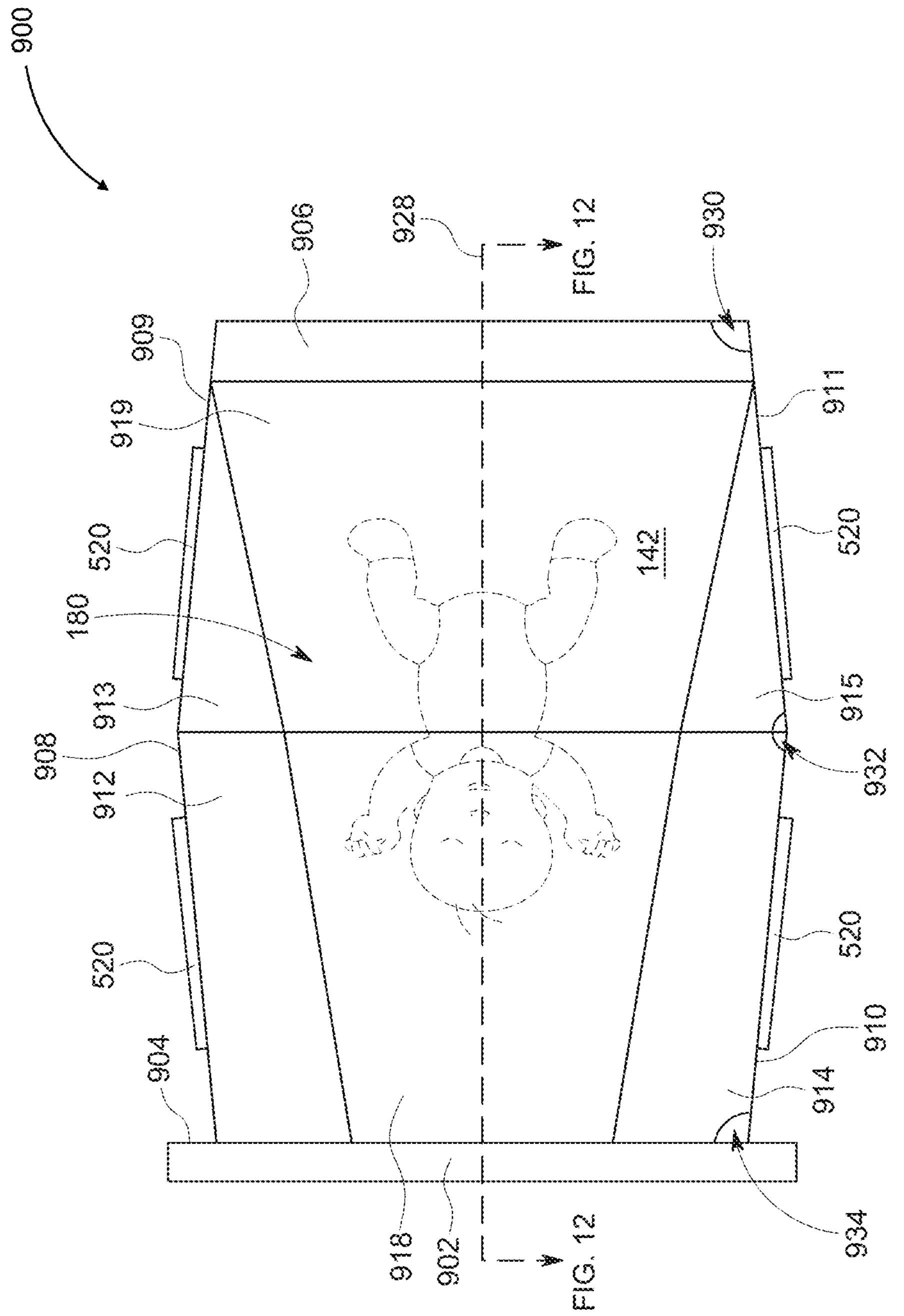
FIG. 10 shows a top plan view of the infant incubator of FIG. 9.

As best shown in FIG. 10, first side wall 908 and second side wall 909 are vertical and angled away from a right angle with first head wall 902, the intersection defining angle 934. Accordingly, opposing walls 908, 909 are non-parallel. In some embodiments, internal angle 934 is between 91 degrees and 115 degrees, and preferably 100 degrees. Third and fourth side walls 909, 911 are vertical and similarly oriented away from a rectangular configuration. Side walls 909, 911 intersect with second head wall 906 at an angle 930 (measured in the plane of patient support surface 142). Accordingly, opposing walls 909, 91 are non-parallel. Additionally, internal angle 930 may be different than internal angle 934, such that side wall 908 is additionally non-parallel with side wall 911, and side wall 910 is non-parallel with side wall 909. In some embodiments, internal angle 930 is between 91 degrees and 115 degrees, and preferably between 100 degrees and 100 degrees. In some embodiments, internal angle 934 shown at the intersection of side walls 910 and 911, is between 145 degrees and 170 degrees, and preferably between 155 degrees and 165 degrees.

Figure 11:
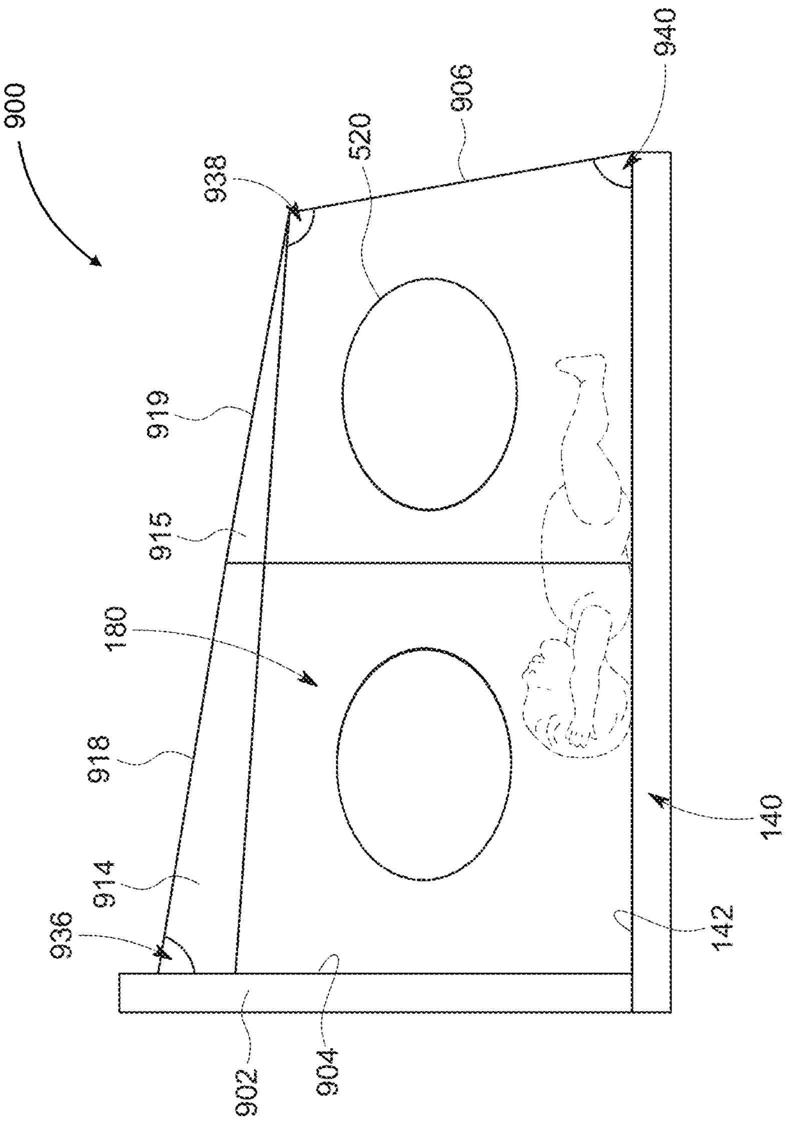
FIG. 11 shows a side view of the infant incubator of FIG. 9.
Figure 12:
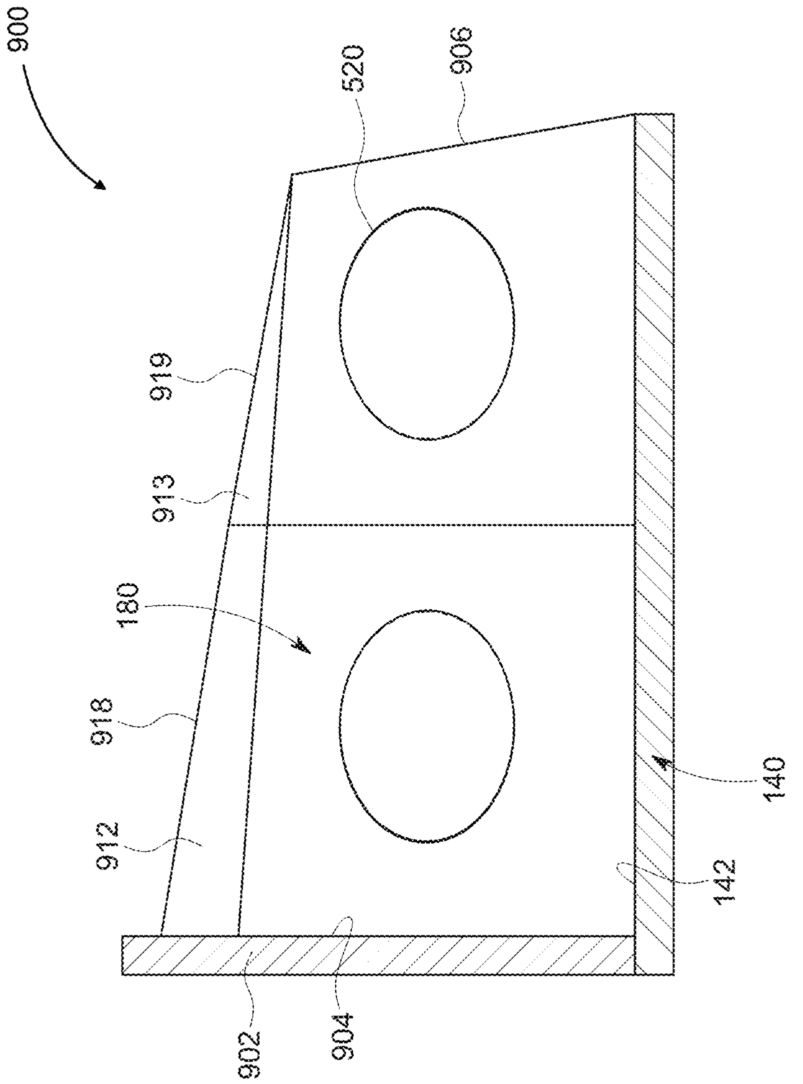
FIG. 12 shows a side cross-sectional view of the infant incubator of FIG. 9.

Referring to FIG. 11, a generally planar second head wall 906 is shown tilted away from vertical with respect to patient support surface 142, such second head wall 906 forms an internal angle 940 at the intersection with patient support surface 142. The internal angle 940 may be between 70 degrees and 89 degrees, and preferably between 80 degrees and 85 degrees.

Top panel 918 and second top panel 919 are angled away from horizontal with respect to patient support 140 and patient support surface 142. Top panels 918, 919 may be co-planar, or may alternative have an internal angle at their intersection that is less than 180 degrees. Top panel 918 intersects with first head wall 902 at internal angle 936. Accordingly, top panels 918, 919 are non-parallel with patient support surface 142. In embodiments, internal angle 936 is between 70 degrees and 89 degrees, and preferably between 80 degrees and 85 degrees.

Enclosure 500 may optionally be provided with transition panels 912, 913, 914, and 915. Each transition panel 912, 913, 914, and 915 is non-parallel with opposing patient support surface 142, and non-parallel with each other.

In operation, sound and noise are transmitted through walls of the incubator, impinging on the infant within. Incident sound waves contacting the walls of the incubator are partially absorbed, partially reflected, and partially transmitted. Transmission of the incident sound waves to the interior of the incubator space is minimized by aspects of this invention. What has not been appreciated in the design and development of infant incubators, in use since at least the year 1909, is the selection of materials, construction of the walls relative to their springiness, and the layering of materials can greatly affect the amount of transmission. An incident sound wave will establish a standing wave within the medium of the incubator wall. The frequency of the standing wave is related to the thickness of the incubator wall. When the wall is constructed of multiple layers having different properties such as density, thickness, hardness (as measure, for instance, on a durometer scale), the impedance mismatch between these layers will further attenuate the sound waves impinging the infant within the incubator 100. This passive attenuation of sound waves through the impedance mismatch, increased reflection of sound, decrease of standing waves within the incubator wall 110 will result in a quieter and more restful environment for the hospitalized infant.

The ANC system in some embodiments comprises an error sensor that is one or more microphones positioned near the point at which noise cancellation is desired. This is often near the ear of a human. In the case of an infant in an infant incubator, it may not be possible or preferred to position a microphone directly on the infant, especially if attached by wires that could limit movement of the infant or present a strangulation hazard. This invention comprises a surface that includes a series or array of microphones generally arranged in a region where noise attenuation is desired. In an infant incubator, this may be where an infant's head would be likely positioned.

Figure 13:
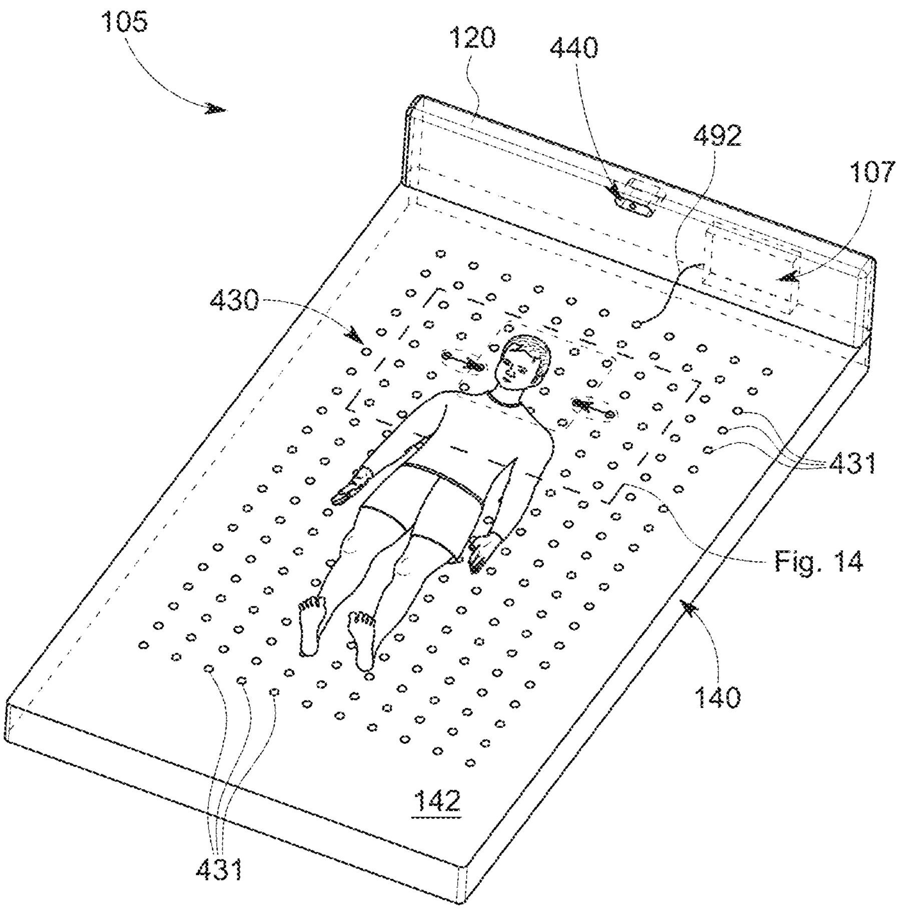
FIG. 13 shows a perspective view of portions of an ANC system having an error sensor array.
Figure 14:
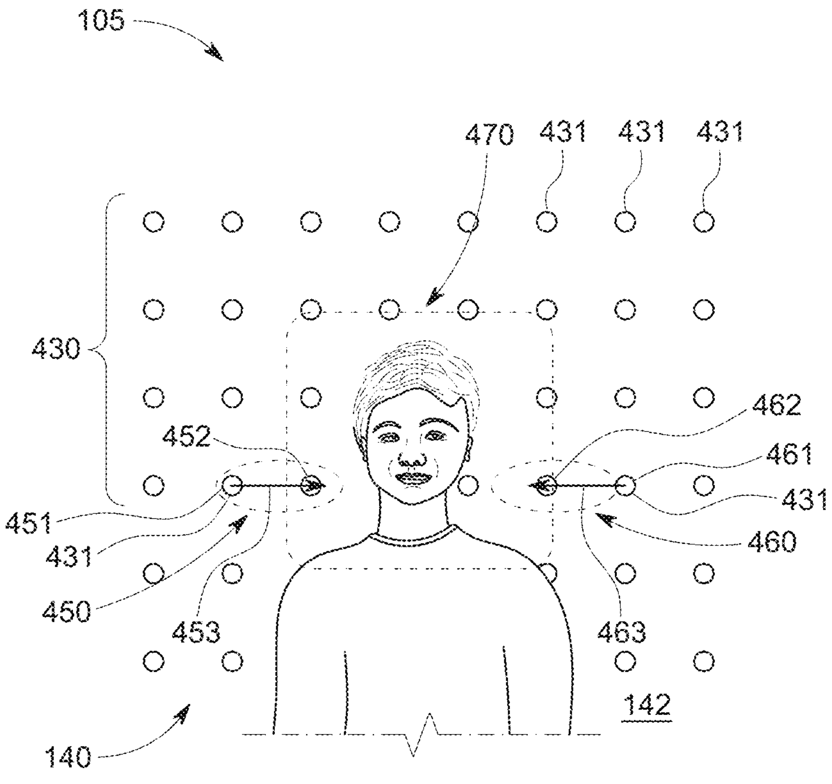
FIG. 14 shows a top plan detail view of portions of the ANC system of FIG. 13.

Referring to FIGS. 13 and 14, a patient support 140 having support surface 142 is covered with an error sensor array 430 that comprises a grid of microphones 431 positioned at regular intervals such that no matter where the infant should be positioned, a microphone will be near the infant's ears. In another embodiment, the error sensor array 430 is embedded in the patient support 140. With the error sensor array 430 in data communication with the control unit 107 via an error sensor cable 492, one or more of the microphones 431 of the error sensor array 430 are selectively employed as the error sensor of the ANC system 105.

A position detection system 440 is provided in data communication with control unit 107. The position detection system 440 is configured to determine where the head and the ears of the infant are located, thereby allowing positioning detection system and control unit 107 to determine which of the microphones 431 of array 430 are to be selected as error sensors by control unit 107. In one embodiment, the position detection system 440 is a pressure sensitive element or elements also part of the surface that includes the error sensor array 430. In another embodiment, the position detection system is a visual-based system similar to the Microsoft Azure Kinect system. Other position detection systems are also envisioned. The position detection system is in data communication with the control unit 107, directing which subset of the error sensors 431 of the error sensor array 430 sensors are to be used.

Figure 17:
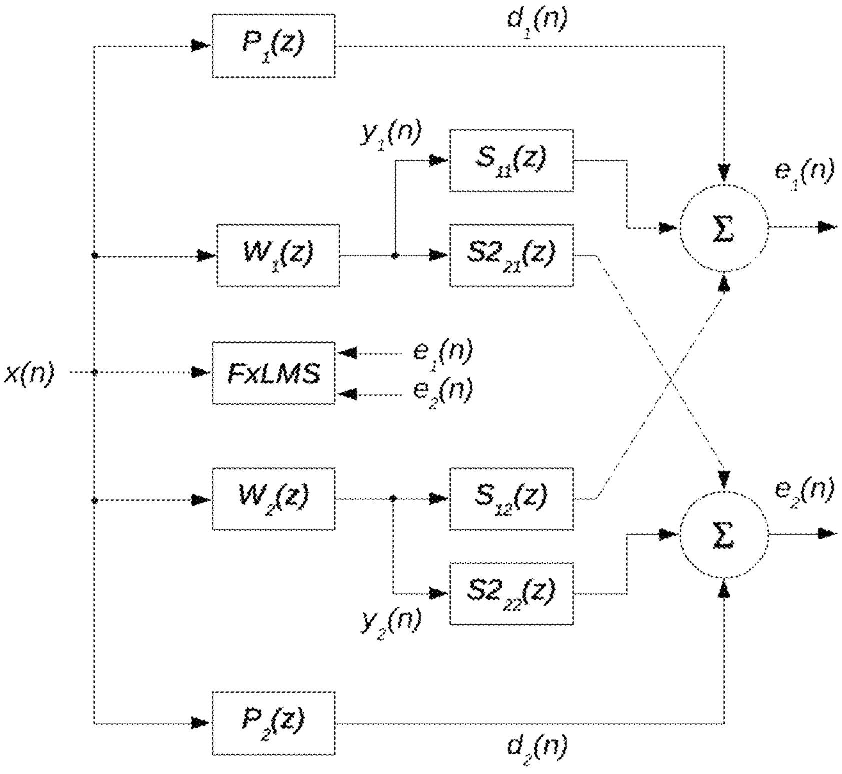
FIG. 17 shows a block diagram of a two-channel ANC system.

In some embodiments, the active noise control system comprises one reference sound pressure sensor, two error sound pressure sensors, and two speakers, the two error sensors positioned proximate the region where noise reduction is desired. Such a multi-channel system may be known as a 1×2×2. A multi-channel ANC system uses multiple secondary loudspeakers and error sensors to produce a larger quiet zone. Referring to FIG. 17, a detailed block diagram of the two-channel ANC system with a single reference signal x(n) is provided. The primary paths $P_1(z)$ and $P_2(z)$ are from the noise source to both the error microphones; the primary noises to be cancelled are $d_1(n)$ and $d_2(n)$; and the residual noises are $e1(n)$ and $e_2(n)$. The canceling signals $y_1(n)$ and $y_2(n)$ are generated by the adaptive filters $W_1(z)$ and $W_2(z)$, respectively, to drive the secondary loudspeakers. The secondary paths $S_{11}(z)$ and $S_{21}(z)$ are from $y_1(n)$ to the error signals $e_1(n)$ and $e_2(n)$, respectively; and $S_{12}(z)$ and $S_{22}(z)$ are from $y_2(n)$ to the error signals $e_1(n)$ and $e_2(n)$, respectively. The canceling signals are computed as $$y_i(n) = W_i^T(n)X(n),\ i = 1, 2.$$

The adaptive filters are updated by the 1×2×2 F×LMS algorithm as $$W_i(n+1) = w_i(n) + \mu[e_1(n)x(n) * \widehat{s_{1i}}(n) + e_2(n)x(n) * \widehat{s_{2i}}(n)],\ i = 1, 2,$$

where $\widehat{s_{11}}$(n) and $\widehat{S_{21}}$(n) are the impulse responses of secondary-path models $\widehat{s_{11}}$(z) and $\widehat{S_{21}}$(z), respectively, and $\widehat{s_{12}}$(n) and $\widehat{s_{22}}$(n) are the impulse responses of secondary-path models $\widehat{s_{12}}$(z) and $\widehat{s_{22}}$(z), respectively.

In some embodiments, the residual noise sensor 190 is an energy density sensor as shown in FIGS. 1-4. The energy density sensor comprises two or more pairs of sound pressure sensors as described in U.S. Pat. No. 7,327,849, which is hereby incorporated by reference in its entirety. The total energy acoustic field is composed of both potential and kinetic energy quantities. The potential energy is a function of acoustic pressure, and the kinetic energy is a function of the acoustic particle velocity. The potential energy may be expressed by:

$$E_p = \frac{1}{2}\left(\frac{p^2}{\rho_0 c^2}\right)V_0,$$

where p is acoustic energy, $p_0$ is the ambient density of air, c is the speed of sound, and $V_0$ is the volume of air containing the potential energy. The total kinetic energy in a volume of air may be expressed by:

$$E_k = \frac{1}{2}\rho_0 V_0 \mu^2,$$

Where μ is the magnitude of the acoustic particle velocity. The instantaneous total acoustic energy density is the sum of the potential energy density and the kinetic energy density and may be expressed by:

$$E_i = \frac{1}{2}\rho_0\left[\mu^2 + \left(\frac{p}{\rho_0 c}\right)^2\right].$$

By assuming the density of air and the speed of sound in air to be known constants, only the acoustic pressure and the particle velocity need be measured in order to calculate energy density. Using a pair of acoustic sensors, particle velocity can be measured along the axis of the acoustic sensors in a single direction.

In some embodiments, the sound pressure sensors are microphones. In some embodiments, the sound pressure sensors are arranged in orthogonal pairs. In an illustrative example, the energy density sensor 190 is fashioned as a cube with three pairs of sound pressure sensors positioned in the middle of each face of the cube, as described in Applicant's U.S. patent application Ser. No. 17/020,725, now U.S. Pat. No. 11,264,005B2, and incorporated herein by reference. In another illustrative example, the energy density sensor comprises two pairs of sound pressure sensors oriented on planar surface wherein each pair is on a line orthogonal to the other pair. In another embodiment, the two pairs of sound pressure sensors are positioned on or within the surfaces of a rectangular or cylindrical solid. In another embodiment, a plurality of energy density sensors are employed as residual noise sensors, each energy density sensor comprising one pair of sound pressure sensors whereby the differential pressure between the two sound pressure sensors is proportional to the sound particle velocity in the direction along the line between the two sound pressure sensors. In an embodiment, two energy density sensors each comprising a pair of sound pressure sensors are oriented generally along a line towards the ears of a person. In one embodiment, the pair energy density sensors are positioned on a support surface on which a person is lying. In another embodiment, the pair of energy density sensors are elevated above the support surface and essentially at the same level as the ears of a person.

The residual noise sensor 190, in data communication with the control unit 107, provides information about the sound pressure level in a region and sound particle velocity in the direction of each sensor pair. In some embodiments, the sound pressure level is read from a single sound pressure sensor while in other embodiments, the sound pressure level is taken from a representative value of a plurality of sound pressure sensors. The combination of the sound pressure level and the sound particle velocities is employed by the control panel to calculated the residual noise in the region proximate the residual noise sensor.

In other embodiments of the invention, the residual noise sensor is an energy density sensor in which the pairs of sound pressure sensors are oriented in an essentially planar configuration as shown in FIGS. 13 and 14. In the embodiment shown, a first sensor pair 450 comprising microphones 451 and 452, and a second sensor pair 460 comprising microphones 461 and 462 are selected from the error sensor array 430 by control unit 107. Since the energy density sensor relies on sound particle velocities proximate a desired region, the first sensor pair 450 and the second sensor pair 460 may be selected based on their proximity to the region. The desired region may be selected as the volume of space generally around the head of an infant positioned within an infant incubator 100.

As shown in FIG. 14, the first and second sensor pairs (450, 460) are immediately adjacent sound pressure sensors. Sound pressure sensors 451, 452 of first sensor pair 450 are oriented generally along a line 453 towards the ears of a person, and sound pressure sensors 461, 462 of second sensor pair 460 are oriented generally along a line 463 towards the ears of the person. In other embodiments, these pairs may be selected from diagonally adjacent sound pressure sensors or non-adjacent sound pressure sensors.

The energy density sensor also relies on a representative sound pressure level of the region. This representative sound pressure level may be calculated from a sensor group 470 of one or more sound pressure sensors 431 of the error sensor array 430. The representative value may be an average, a median, or some other measure of central tendency. The selection of the appropriate first and second sensor pairs 450, 460 may be suggested by the position detection system 440 shown in FIG. 13, or a pressure sensitive sheet on or in the patient support surface 142 or patient support 140.

Figure 15:
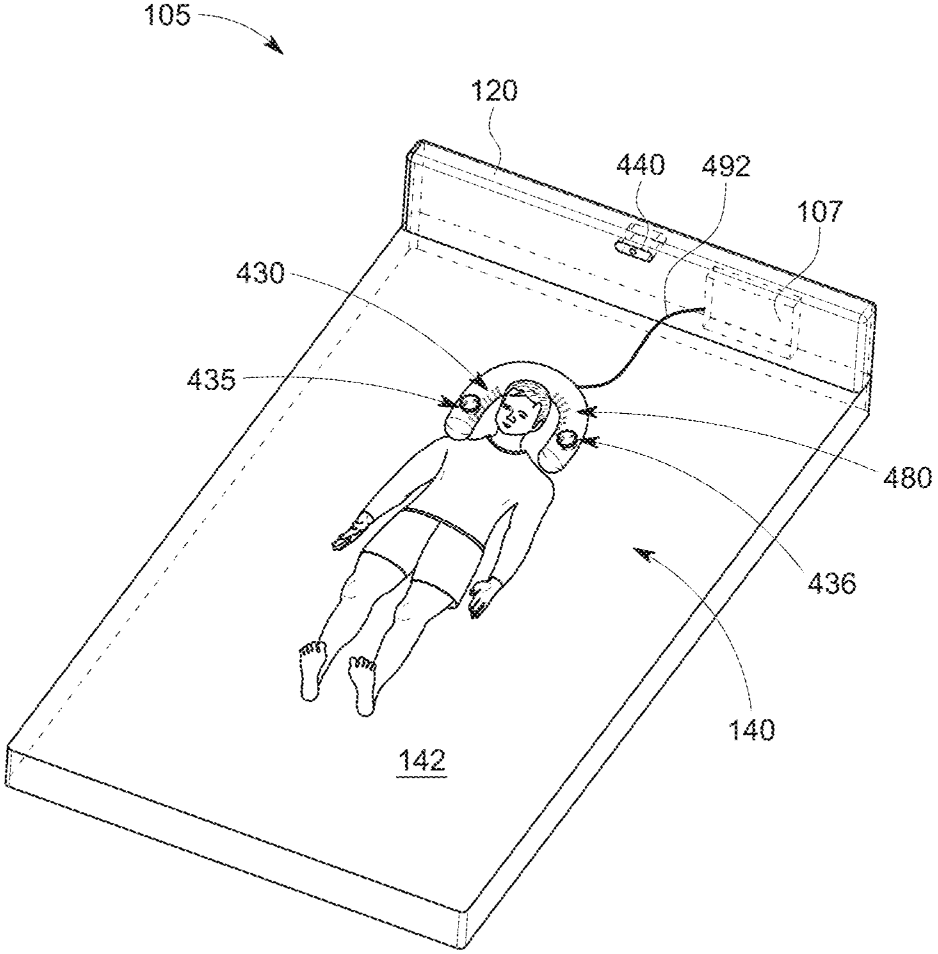
FIG. 15 shows perspective view of portions of an ANC system having an error sensor array deployed on a flexible bolster.
Figure 16:
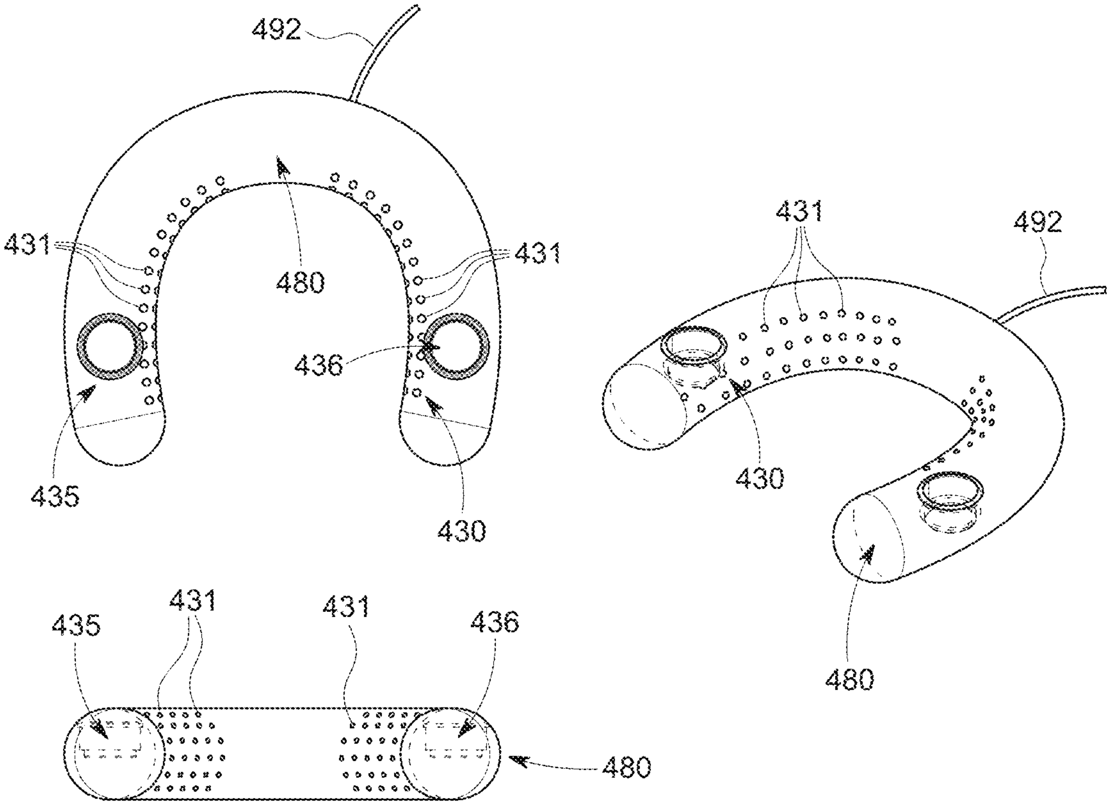
FIG. 16 shows top, side, and perspective views of portions of an ANC system having an error sensor array deployed on a flexible bolster.

Referring to FIGS. 15 and 16, another embodiment of the invention is shown. In some clinical situations, an infant is secured in place by a flexible bolster 480. The flexible bolster 480 may be an essentially flexible tubular structure that can be molded and positioned around the infant or the infant's head. The bolster so arranged may keep the infant in a safe position and can provide comfort to the infant. In other instances, the bolster may be a moldable support surface that when molded to a shape around the infant, will essentially hold the designed shape. The bolster 480 may comprise a flexible covering such as a fabric or other material that forms a contiguous closed surface surrounding a conformable filling. In common parlance, the bolster 480 may be similar to a bean bag. In other embodiments, the bolster 480 may be similar to a fluidized positioner such as the Mölnlycke Z-Flo device. The error sensor array 430 may be fixed to a flexible sheet that wraps around the bolster 480 or may be affixed to the material that directly surrounds the filling of the bolster 480. The error sensor array 430 is in data communication with the control unit 107 via a bolster cable 492.

In FIG. 15, a bolster 480 is shown around the head of an infant resting on the patient support surface 142. Arranged on the surface of the bolster 480 is the error sensor 430. In one embodiment, the error sensor array 430 is positioned on the surface of the bolster 480 facing the infant's head, although in other embodiments the error sensor array 430 is positioned around the entire outer surface of the bolster 480. The error sensor array 430 is in data communication with the control unit 107. In some embodiments, the density of the individual sensors 431 within the error sensor array 430 is between 20 mm to 25 mm between adjacent sensors along an axis. In other embodiments, the individual sensors are spaced between 10 mm and 30 mm between adjacent sensors along an axis. In other embodiments the individual sensors are spaced further between 5 mm and 50 mm between adjacent sensors along an axis.

As best shown in FIG. 16, the bolster 480 may also comprise a first bolster speaker 435 and a second bolster speaker 436. The first and second bolster speakers 435, 436 may be embedded within the bolster 480 and are in data communication with the control unit 107. In some embodiments, the data communication is executed via the bolster cable 492. The first and second bolster speakers 435, 436 transmit the cancelling sound wave generated by the control unit 107. In the determination of the correct cancelling sound wave, the active noise control algorithm calculates two secondary pathways, one between the first bolster speaker 435 and an individual sensor of the error sensor array 430 proximate to a first ear of the infant in the incubator and a second between the second bolster speaker 436 and an individual sensor of the error sensor array 430 proximate a second ear of the infant in the incubator. The individual sensor of the error sensor array 430 is selected in some embodiments by a measurement of the position detection system 440. In other embodiments, the individual sensor 431 of the error sensor array 430 is a default sensor that would be nominally positioned proximate the ear of an infant positioned within the bolster 480.

In some embodiments, the first and second bolster speakers 435, 436 are oriented with their faces essentially on the superior aspect of the bolster 480. When so oriented, the hard faces of the first and second bolster speakers 435, 436 will be positioned away from the infant's head. In other embodiments, the first and second bolster speakers 435, 436 are oriented on the inner aspect of the bolster 480, proximate each of the two ends of the bolster 480. When so oriented, the face of the first and second bolster speakers 435, 436 will be directed essentially towards the ears of the infant. In other embodiments, the first and second bolster speakers 435, 436 have other orientations with regards to the bolster 480.

The invention may be embodied in other specific forms without departing from the spirit or essential characteristics thereof. The foregoing embodiments are therefore to be considered in all respects illustrative rather than limiting on the invention described herein. Scope of the invention is thus indicated by the appended claims rather than by the foregoing description and all changes that come within the meaning and range of equivalency of the claims are therefore intended to be embraced therein.

All references cited in this specification are hereby incorporated by reference. The discussion of the references herein is intended merely to summarize the assertions made by the authors and no admission is made that any reference constitutes prior art. Applicants reserve the right to challenge the accuracy and pertinence of the cited references.

We claim:

1. An active noise control system comprising:

an enclosure, wherein the enclosure is an infant incubator;

one or more reference input sensors disposed outside of the enclosure;

an error sensor array comprising one or more error sensors disposed within the enclosure;

a positioning detection system;

one or more speakers disposed within the enclosure; and a processing unit in data communication with the one or more reference input sensors, the error sensor array, the positioning detection system, and the one or more speakers, wherein the one or more reference input sensors generate one or more reference input signals prompted by one or more noise sound waves generated by one or more noise sources;

wherein the positioning detection system generates target position data representative of a position of a head and ears of an infant, and wherein the processing unit is configured to receive the target position data and determine a position of a target quiet zone based on the position of the head and ears of the infant;

wherein the processing unit selectively chooses, based on the position of the head and ears of the infant, which one or more error sensors from a subset of the error sensors of the error sensor array to select to determine a target zone sensor array;

wherein the target zone sensor array consists of at least one microphone selected from the error sensor array;

wherein the processing unit is configured to execute an adaptive noise control algorithm prompted by the reference control signal received from the one or more reference input sensors and an error signal received from the target zone sensor array, and wherein the adaptive noise control algorithm generates an output control signal for the one or more speakers to generate a control sound wave configured to destructively interfere with the noise sound waves at the position of the head and ears of the infant upon the noise sound waves entering the enclosure.

2. The active noise control system of claim 1, wherein the error sensor array further comprises a flexible surface.

3. The active noise control system of claim 1, wherein the error sensor array is embedded in a patient support.

4. The active noise control system of claim 1, wherein the error sensor array is embedded in a bolster support.

5. The active noise control system of claim 4, wherein the one or more speakers is integral with the bolster support.

6. The active noise control system of claim 1, wherein the one or more error sensors is adapted to detect sound pressure level.

7. The active noise control system of claim 1, wherein the one or more error sensors is configured to detect both sound pressure level and sound particle velocity.

8. The active noise control system of claim 1, wherein the target zone sensor array consists of a single microphone selected from the error sensor array.

9. The active noise control system of claim 1, wherein the target zone sensor array consists of a pair of microphones selected from the error sensor array.

10. A method for providing noise cancellation, the method comprising the steps of:

providing an enclosure, wherein the enclosure is an infant incubator;

providing one or more reference input sensors disposed outside of the enclosure;

providing an error sensor array comprising one or more error sensors disposed within the enclosure;

providing a positioning detection system;

providing one or more speakers disposed within the enclosure; and providing a processing unit in data communication with the one or more reference input sensors, the error sensor array, the positioning detection system, and the one or more speakers, generating one or more reference input signals via the one or more reference input sensors prompted by one or more noise sound waves generated by one or more noise sources;

generating target position data representative of a position of a head and ears of an infant at the positioning detection system;

receiving the target position data at the processing unit and determining by the processing unit a position of a target quiet zone based on the position of the head and ears of the infant;

selectively choosing via the processing unit, based on the position of the head and ears of the infant, which one or more error sensors from a subset of the error sensors of the error sensor array to select to determine a target zone sensor array;

wherein the target zone sensor array consists of at least one microphone selected from the error sensor array;

executing an adaptive noise control algorithm at the processing unit prompted by the reference control signal received from the one or more reference input sensors and an error signal received from the target zone sensor array, and wherein the adaptive noise control algorithm generates an output control signal for the one or more speakers to generate a control sound wave configured to destructively interfere with the noise sound waves at the position of the head and ears of the infant upon the noise sound waves entering the enclosure.

* * * * *